United States Patent
Pudleiner et al.

(10) Patent No.: US 8,084,570 B2
(45) Date of Patent: Dec. 27, 2011

(54) POLYCARBONATE FOR MAKING EXTRUDED FILMS THAT ARE VIRTUALLY FREE OF SURFACE DEFECTS

(75) Inventors: Heinz Pudleiner, Krefeld (DE);
Wolfgang Ebert, Krefeld (DE);
Alexander Meyer, Düsseldorf (DE);
Klaus Meyer, Dormagen (DE);
Alexander Karbach, Krefeld (DE);
Franky Bruynseels, Gillis-Waas (BE)

(73) Assignee: Bayer MaterialScience AG, Leverkusen (DE)

( * ) Notice: Subject to any disclaimer, the term of this patent is extended or adjusted under 35 U.S.C. 154(b) by 818 days.

(21) Appl. No.: 11/977,586

(22) Filed: Oct. 25, 2007

(65) Prior Publication Data
US 2011/0127468 A1 Jun. 2, 2011

(30) Foreign Application Priority Data
Oct. 31, 2006 (DE) .......... 10 2006 051 306

(51) Int. Cl.
*C08G 64/00* (2006.01)

(52) U.S. Cl. ........ 528/196; 524/115; 524/387; 524/413; 524/437; 525/67; 525/418; 525/439; 525/462; 528/198

(58) Field of Classification Search .......... 524/115, 524/387, 413, 437, 451, 539; 525/67, 418, 525/439, 462, 466; 528/196, 198
See application file for complete search history.

(56) References Cited

U.S. PATENT DOCUMENTS

| 6,288,204 B1 | 9/2001 | Ogawa et al. ........ 528/196 |
| 6,720,406 B1 | 4/2004 | Elsner et al. ........ 528/499 |
| 6,815,524 B1 | 11/2004 | Bödiger et al. ........ 528/198 |
| 2005/0043500 A1 | 2/2005 | Bodiger et al. ........ 528/198 |

FOREIGN PATENT DOCUMENTS

| JP | 08109252 | 4/1996 |
| JP | 2003-231141 | 8/2003 |
| JP | 2005082647 | * 3/2005 |
| WO | WO 0190215 | * 11/2001 |

OTHER PUBLICATIONS

International Search Report and Written Opinion mailed Apr. 2, 2008.

* cited by examiner

*Primary Examiner* — Terressa Boykin
(74) *Attorney, Agent, or Firm* — Connolly Bove Lodge & Hutz LLP

(57) ABSTRACT

Linear polycarbonate resin virtually free of surface defects that impair the suitability of the resin for demanding optical application is disclosed. Also disclosed is a process for the manufacture of the resin. The surface defects included in the resin are in the form of transparent fluorescing particles, the particle count of which portion that are 15 and 250 μm in size, is up to 1.8 counts/g, said count being determined by exciting the residue remaining after filtering a solution of said polycarbonate in methylene chloride through a Teflon filter of 5 μm pore size at a wavelength of 400-440 nm, 25× overall magnification and illumination time of 40 millisec. The polycarbonate is suitable for making films of improved optical properties.

9 Claims, No Drawings

POLYCARBONATE FOR MAKING EXTRUDED FILMS THAT ARE VIRTUALLY FREE OF SURFACE DEFECTS

FIELD OF THE INVENTION

The invention relates to polycarbonate resins and in particular to polycarbonate suitable for making extruded products that are virtually free of surface defects.

BACKGROUND OF THE INVENTION

These polycarbonate products include in particular qualitatively high-grade extrudates such as films, sheets or cable sheathings based on polycarbonate. These articles may be produced by conventional techniques, such as for example extrusion, blow molding or press molding methods. The invention also provides a process for the production of such substrate materials.

Extrusion films of polycarbonate, polyester carbonate or also blends of PC and polyesters such as polyethylene terephthalates, polybutylene terephthalates or polycyclohexanedimethanol cyclohexanedicarboxylate (PCCD), such as for example those with the registered trade marks SOLLX® or XYLEX® (both from General Electric, USA), are used especially in the electronics sector, for decorative and functional blends in the domestic appliances sector, as sealing films, e.g. for sports articles, for ID cards and blister packaging. Further areas of application are in the automotive manufacturing sector, such as for example vehicle body parts or exterior mirrors, or in the telecommunications sector, such as for example mobile phone cases and keypads. The films are characterized by high transparency, impact strength and thermal stability. A further critical quality feature is the surface quality of the film. Surface defects readily occur especially with high-grade housing and display coverings, which leads to an increased rejection rate.

High quality extrusion films are also important as cover layers for optical data storage media. Here the requirements as regards the quality of the film are particularly stringent, since defects in the transilluminated cover layer material may lead to errors in the readout process. Thus, in particular defects which may interact with the laser beam of the readout system are of particular relevance as regards an error-free readout process. Such defects include, as is known, foreign particles such as for example dust particles or metal particles, which may absorb and/or scatter the laser beam. Due to the reduction of the wavelength of the readout laser, in addition those particles whose absorption lies within the wavelength of the employed laser are also damaging. For example with the Blu ray Disk, which is equipped with a cover layer, these wavelengths are for example between 400 nm and 410 nm.

It is known that foreign particles may initiate defects in the polymer matrix. Defects in the surface may be caused by a specific location of the foreign particle, for example in an extrusion film. These foreign particles may be carbon particles, so-called "black spots", dust, metal particles, other polymer impurities (different from the used base resin) such as for example polyamide, or cotton fibers, etc.

Furthermore the surface imperfections may be caused by the extrusion process itself. Depending on the extrusion conditions, such as for example calender settings, defects such as air inclusions may be produced. These defects may be minimized by optimizing the production conditions.

It is known that the number of foreign particles in the extrusion film may be reduced by ensuring particularly clean ambient conditions, such as clean room conditions, for example by using filtered air. This is described for example in DE 19952852.

Furthermore substrate materials with a low foreign particle content and which provide a good surface quality are described for example in JP 2003231141. These substrate materials described in JP 2003231141 are outside the scope of the present invention, since the present invention concerns substrate materials that have a low concentration of a specific type of particles.

In DE 199 52 850 polycarbonate substrates are described that are suitable for the production of molding compounds and films having a high surface quality. In particular these materials are suitable for the production of twin-wall sheets and solid sheets. This substrate material may be produced by specific production processes, in which the starting materials have low concentrations of certain elements such as Fe, Cr, Ni, Zn, Ca, Mg or Al. However, the formation of the particles covered by the present invention and thus the surface defects are not suppressed by reducing the concentration of these elements.

In U.S. Pat. No. 6,288,204 gel particles in branched polycarbonate are described, which may lead to defects. In principle it is known that branched polycarbonate contains defect sites. These are not covered here. The present invention relates to linear polycarbonates.

It was surprisingly found that defects in the surface of the film are caused not only by usual dust particles or other foreign particles, but in particular by fluorescing particles with specific mechanical properties. These particles cannot be separated by conventional filtration. The foreign particles described in the present invention, which lead to excessive surface defects, cannot be detected in a solvent in which the substrate material is soluble, since they have a similar refractive index to polycarbonate. Thus, these particles cannot be detected for example by a Hiac Royco test corresponding to the prior art.

The normally filterable particles known in the prior art, such as for example "black spots", are therefore not covered by the present invention.

It was found instead that for example 40-80% of the particles that initiate a surface defect contain a fluorescing core. It was furthermore found that the size of these fluorescing particles is between 15 and 250 µm.

It was in addition found that a majority of these fluorescing particles have mechanical properties different from the polymer matrix (polycarbonate) itself. Specific measurements of the mechanical properties of the particles reveal a higher modulus as well as a greater hardness compared to the matrix material (polycarbonate). These fluorescing particles may initiate defect sites, such as for example depressions, pits or round deformations or concavities, on the film surface, which significantly reduce the quality of the film. These defect sites then lead to problems particularly if the film is to be coated or metallized with a further material. The defects in the surface of the film then lead to further defects in the coated film.

It was found that extrudates (films, sheets and cable sheathings) and molding compounds produced by press molding methods, based on the molding compounds according to the invention, have surfaces with a low concentration of defect sites. A further advantage of the invention is that the thermoplastic molding compounds may readily be processed into extrudates, for example by extrusion, blow molding, cable pultrusion, and into molded articles by press molding methods. The extrudates according to the invention and molded articles produced by press molding methods may then be further processed, printed and/or laser inscripted by conventional techniques, e.g. thermoforming.

The object of the present invention is to provide linear polycarbonate resin having a low fluorescent particle count, making it suitable for extrudates such as films, sheets and cable sheathings having improved surface quality and which may be produced by conventional techniques such as for example extrusion, blow molding or press molding methods from the thermoplastic molding compounds.

SUMMARY OF THE INVENTION

Linear polycarbonate resin virtually free of surface defects that impair the suitability of the resin for demanding optical application is disclosed. Also disclosed is a process for the manufacture of the resin. The surface defects included in the resin are in the form of transparent fluorescing particles, the particle count of which portion that are 15 and 250 μm in size, is up to 1.8 counts/g, said count being determined by exciting the residue remaining after filtering a solution of said polycarbonate in methylene chloride through a Teflon filter of 5 μm pore size at a wavelength of 400-440 nm, 25× overall magnification and illumination time of 40 millisec. The polycarbonate is suitable for making films of improved optical properties.

DETAILED DESCRIPTION OF THE INVENTION

The term films normally denotes materials that may be coiled/wound, whereas sheets are in general rigid and therefore cannot be coiled or wound. The thickness of the films is preferably 50 to 1000 μm, particularly preferably 150 to 800 μm and most particularly preferably 250 to 600 μm. If the films according to the invention are multi-layer films, then the aforementioned thickness figures refer to a plurality of layers of the polycarbonates according to the invention.

Sheets within the context of the invention generally have a thickness of 1.0 mm to several cm, preferably 1.0 mm to 4 cm, in particular 1.0 mm to 2.5 cm.

The larger the number of fluorescing particles of a specific size in the polymer granules, the greater is the probability of defect sites on the surface of an extruded film or sheet made therefrom. The quality of the product is thus impaired since the surface quality is significantly reduced. It was surprisingly found that not all fluorescing particles lead to flow defects, but only particles of a specific size. Particles with a diameter of >15 μm lead disproportionately to defect sites on the surface of the extrusion film or sheet. Diameter in this context means the dominant, or largest dimension of a fluorescing particle. In particular particles of which diameter is greater than 120 μm lead to defect sites on the surface of the extrusion film or sheet.

This was not obvious in the light of the prior art and the object therefore arose of identifying the critical size of these particles and of providing a method for detecting these particles, and thus ultimately of providing a substrate material that is suitable for the production of qualitatively high-grade extrusion films.

The present invention therefore relates in one embodiment to polycarbonate, characterized in that the particle count of transparent fluorescing particles of size between 15 and 250 μm is 0.1-1.8 counts/g, measured on the residue remaining after filtering a solution of the polycarbonate in methylene chloride (the unit gram means the amount of polycarbonate, for example resin, film or sheet), the filtering carried out through a Teflon filter with a 5 μm pore size, and the fluorescing upon excitation wavelength of 400-440 nm and a 25× overall magnification with an illumination time of 40 millisec.

The present invention also relates to such a polycarbonate, the polycarbonate being unbranched. The term polycarbonate as used throughout this text refers to any of polycarbonate, copolycarbonate and polyestercarbonate.

Furthermore the present invention relates to such a polycarbonate, characterized in that the particle count of particles with a particle diameter of >120 is not more than 0.02 count/g.

Furthermore the present invention relates to such a polycarbonate, characterized in that the particle count of transparent fluorescing particles of size between 15 and 250 μm is 0.1-1.5 counts/g.

Furthermore the present invention relates to polycarbonate obtainable according to one of the processes mentioned above, the use of such a polycarbonate for the production of extrusion films, as well as an extrusion film containing such a polycarbonate.

Furthermore the present invention relates to a process for the production of extrusion films, comprising
  a) melting such a polycarbonate
  b) calendering the melt into a film
  c) cooling the melt,
as well as an extrudate (films, sheets and cable sheathings) obtained by this process.

Furthermore the present invention relates to such an extrusion film, characterized in that it comprises at least one layer in which bisphenol A based polycarbonate (BPA-PC), copolycarbonate based on BPA and BPTMC (Apec® polycarbonate, a product of Bayer MaterialScience AG, Leverkusen, Germany), aromatic polyester carbonate or polyester block carbonate was used as substrate material, in particular characterized in that a blend of BPA-PC with polyester siloxane or polysiloxane was used as substrate material, and the use of such extrusion films for the production of blends, sealing films, vehicle body parts, exterior mirrors, mobile phone casings, mobile phone keypads or cover layers for optical data storage media.

Furthermore the present invention relates to a process for obtaining a polycarbonate with a particle count of 0.1-1.8 counts/g of fluorescing particles of size between 15 and 250 μm, in which
  a) linear polycarbonate is produced
  b) the polycarbonate produced in step a) is analyzed for the particle count of those of its fluorescing particles having sizes of 15 to 250 μm,
  c) steps a) and b) are repeated while altering the process parameters residence time, pressure or temperature, until a particle count of 0.1-1.8 counts/g of fluorescing particles or size between 15 and 250 μm is obtained in step b),
as well as such a process, in which in step c) the particle count of the particles with a particle diameter of >120 μm is not more than 0.02 count/g, or 0.1-1.5 counts/g.

Furthermore the present invention relates to such a process, in which in step b) the particle count is carried out by dissolving the material in methylene chloride and filtering through a Teflon filter of 5 μm pore size at an excitation wavelength of 400-440 nm and a 25× overall magnification with an illumination time of 40 millisec.

In this connection a contiguous fluorescing region on the Teflon filter (at an excitation wavelength of 400-440 nm and a 25× overall magnification with an illumination time of 40 millisec) is counted as "1" count (in other words the counted particles may be one particle itself or an area of contiguous clustered particles—both will be counted as one count). In one embodiment, the counting process is run by automatic detection.

The present invention furthermore relates in a modification to the interfacial polymerization process for the production of polycarbonate. Accordingly the polycarbonate is isolated through a plurality of flash evaporation stages and an evaporation extruder, characterized in that in the first evaporation stage are the temperature is 70° to 80° C. at 0.35-0.45 bar excess pressure, and in the second evaporation stage the temperature is 125° to 135° C. at 0.75-0.85 bar excess pressure, and in the third evaporation stage the temperature is 175°-185° C. at 1.85-1.95 bar excess pressure. In an embodiment of the process the temperature difference between any two consecutive flash stages does not exceed 90° C. In a preferred embodiment the difference does not exceed 60° C. In a more preferred embodiment the difference does not exceed 55° C. In yet another embodiment, in the first evaporation stage the temperature is about 75° C. at 0.35-0.45 bar excess pressure, and in the second evaporation stage the temperature is about 130° C. at 0.75-0.85 bar excess pressure, and in the third evaporation stage the temperature is about 180° C. at 1.85-1.95 bar excess pressure.

The present invention relates in a further embodiment to such a process, in which a filtration method with coupled automated evaluation is employed, which isolates the fluorescing particles and classifies them in order of size. The production process may be controlled by this measurement method, so that a substrate material with a low content of fluorescing particles may be produced which is suitable for the production of qualitatively high-grade extrusion films.

As mentioned above, in contrast to the known Hiac/Royco measurement, in the present case not opaque particles such as dust or metal particles, but instead transparent, fluorescing particles are detected and classified according to size. The inventive method detects impurities that cannot be detected by conventional measurements.

It was also found that the film extrusion process itself, introduces additional fluorescing particles which may lead to surface defects in the film. These number or these additional particles may be minimized by adjusting the parameters of the extrusion process, such as for example the calendering speed and the temperature in the extruder.

The contamination of the extrusion film with the aforedescribed fluorescing particles may be attributed to certain process parameters in the reaction, such as residence time, pressure, temperature or also the purity of the starting materials used, such as for example the purity of the bisphenol or solvent that are used, and in particular to the aforementioned process parameters regarding temperature. Furthermore it is important to use raw materials which are as free as practically possible of contaminants such as heavy metals or salts. Furthermore the contamination with ions such as alkali metal and alkaline earth metal ions may be reduced by optimizing the process steps such as for example the washing of the polymer solutions. Overall various of these influencing factors or also the combination of these influencing factors may cause the particle count of fluorescing bodies in the end product, i.e. in the extrusion film, to rise.

In order to obtain the inventive polycarbonates, a number of further steps may be taken. For example, the parameters described above may be optimized. Furthermore, various production batches may be checked by the method described above. Polycarbonates with particle counts that reside outside the range according to the invention may be screened out and used for other purposes or purified. Furthermore specific filtration media may be used so as to retain particles of critical size. In this case various parameters such as pressure, concentration and temperature must be adjusted so that it is ensured, with the aid of the method described above, that the particle counts are in the range according to the invention. Overall the production processes may be optimized with the aid of this process and the accessibility of low-fluorescing granular material may thus be achieved.

On account of the rheological properties of these transparent fluorescing particles, they may be separated only with difficulty however from the substrate material. These particles are at best only insufficiently retained by conventional filters. This applies for example to conventional thin-layer metal screens. This is also the case if the pore size of the filter is significantly smaller than the mean diameter of the fluorescing particles. At higher pressures and/or higher temperatures the deformability of the particles increases, with the result that these particles may easily pass through conventional filter fabrics with small pore diameters. Thus, conventional flat filters, for example with pore sizes between 50 and 150 µm, do not retain these particles.

The present invention is therefore based on providing polycarbonates having the properties according to the invention and using such polycarbonates to produce the extrusion films according to the invention.

The present invention furthermore relates to an extrusion film containing a polycarbonate according to the invention, as well as to an extrusion film containing a polycarbonate according to the invention, characterized in that it comprises at least one layer in which BPA-PC, copolycarbonate based on BPA and BPTMC (Apec® polycarbonate, a product of Bayer MaterialScience AG, Leverkusen, Germany), aromatic polyester carbonate or polyester block carbonate, was used as substrate material.

The production of the polycarbonates according to the invention is carried out inter alia according to the interfacial polymerization process. This process for polycarbonate synthesis is described copiously in the literature; reference may be made for example to H. Schnell, Chemistry and Physics of Polycarbonates, Polymer Reviews, Vol. 9, Interscience Publishers, New York 1964 p. 33 ff., to Polymer Reviews, Vol. 10, "Condensation Polymers by Interfacial and Solution Methods", Paul W. Morgan, Interscience Publishers, New York 1965, Chapter VIII, p. 325, to Drs. U. Grigo, K. Kircher and P. R-Müller "Polycarbonate" in Becker/Braun, Kunststoff-Handbuch, Vol. 3/1, Polycarbonate, Polyacetale, Polyester, Celluloseester, Carl Hanser Verlag Munich, Vienna 1992, pp. 118-145 as well as to EP-A 0 517 044.

According to this process the phosgenation of a disodium salt of a bisphenol (or of a mixture of various bisphenols) in aqueous-alcoholic solution (or suspension) takes place in the presence of an inert organic solvent or solvent mixture, which forms a second phase. The oligocarbonates which are formed, and which are present mainly in the organic phase, are condensed with the aid of suitable catalysts to form high molecular weight polycarbonates dissolved in the organic phase. The organic phase is finally separated and the polycarbonate is isolated therefrom by various working-up steps.

The continuous production process for polycarbonate by the interfacial polymerization process is particularly suitable for the production of the substrate material according to the invention. A continuous reaction employing a pumping circulation reactor as phosgenation reactor and tubular reactors connected downstream is particularly preferred.

For the production of the substrate material according to the invention the subsequent nature and manner of the isolation of the polycarbonate is in particular also important.

Preferably the evaporation of the polycarbonate solution takes place from a chlorobenzene-dichloromethane mixture with a chlorobenzene content of 20-70 wt. %, preferably 40-60 wt. %. In particular the evaporation of the polycarbonate solution in a thermal process, the so-called flash process, is suitable. In this case the concentration of the polymer solution and optionally also the isolation of the polymer takes place by distilling off the solvent, in which the solvent is removed by super-heating and releasing the pressure on the solvent (flashing). This process is well-known to the person skilled in the art; see also "Thermische Trennverfahren" (thermal separation processes), VCH Verlagsanstalt 1988, p. 114. In the known flash process polymer solutions are repeatedly heated under a slight excess pressure to temperatures above the boiling point under normal pressure, and these solutions, super-heated with respect to normal pressure, are then flashed to a vessel at a lower pressure, for example normal pressure. In this connection it may be advantageous not to make two large steps in terms of temperature between the different concentration stages, but rather to choose a two-stage to four-stage concentration process regarding to small temperature differences from concentration step to concentration step. A three-stage evaporation process with subsequent isolation of the polycarbonate via an evaporation extruder is particularly preferred. For the production of the substrate material according to the invention it may be advantageous to employ a multi-stage evaporation process, in which the temperature differences between the evaporation stages are not more than 90° C., particularly preferably not more than 60° C. In addition it is important to ensure an effective concentration evaporation in order to obtain a material of high quality in the concluding evaporation step, an evaporation extruder preferably being used for this purpose. In this connection it is preferred if in the first evaporation step the temperatures are 70°-80° C. at 0.35-0.45 bar excess pressure, in the second evaporation step the temperatures are 125°-135° C. at 0.75-0.85 bar excess pressure, and in the third evaporation step are 175°-185° C. at 1.85-1.95 bar excess pressure.

The solvent residues may be removed from the highly concentrated polymer melts obtained in this way, either directly from the melt with evaporators extruders (BE-A 866 991), EP-A 0 411 510, U.S. Pat. No. 4,980,105, DE-A 33 32 065), thin-layer evaporators (EP-A 0 267 025), falling-film evaporation, extrusion evaporators or by friction compaction (EP-A 0 460 450, optionally also with the addition of an entrainment agent such as nitrogen or carbon dioxide, or under application of a vacuum (EP-A 0 039 96, EP-A 0 256 003, U.S. Pat. No. 4,423,207), alternatively also by subsequent crystallisation (DE-A 34 29 960) and heating the solvent residues in the solid phase (U.S. Pat. No. 3,986,269, DE-A 20 53 876). In this connection isolation by means of evaporation extruders is preferred.

Granular material is obtained, if possible, by direct spinning of the melt followed by granulation, or by using discharge extruders from which the material is spun in air or under a liquid, generally water. If extruders are used then additives may be added to the melt upstream of this extruder, optionally with the use of static mixers or by side extruders in the extruder.

Suitable aromatic dihydroxy compounds (herein referred to as diphenols) for the production of the polycarbonates to be used according to the invention include for example hydroquinone, resorcinol, dihydroxydiphenyl, bis-(hydroxyphenyl)-alkanes, (bis-hydroxyphenyl)-cycloalkanes, bis-(hydroxyphenyl)-sulfides, bis-(hydroxyphenyl)-ethers, bis-(hydroxyphenyl)-ketones, bis-(hydroxyphenyl) sulfones, bis-(hydroxyphenyl)-sulfoxides, α,α'-bis-(hydroxyphenyl)-diisopropylbenzenes as well as their alkylated, nuclear alkylated and nuclear halogenated compounds.

Preferred diphenols are 4,4'-dihydroxydiphenyl, 2,2-bis-(4-hydroxyphenyl)-1-phenylpropane, 1,1-Bis-(4-hydroxyphenyl)-phenylethane, 2,2-bis-(4-hydroxyphenyl)propane, 2,4-bis-(4-hydroxyphenyl)-2-methylbutane, 1,3-bis-[2-(4-hydroxyphenyl)-2-propyl]benzene (bisphenol M), 2,2-bis-(3-methyl-4-hydroxyphenyl)-propane, bis-(3,5-dimethyl-4-hydroxyphenyl)-methane, 2,2-bis-(3,5-dimethyl-4-hydroxyphenyl)-propane, Bis-(3,5-dimethyl-4-hydroxyphenyl)-sulfone, 2,4-bis-(3,5-dimethyl-4-hydroxyphpenyl)-2-methylbutane, 1,3-bis-[2-(3,5-dimethyl-4-hydroxyphenyl)-2propyl]-benzene, 1-bis(4-hydroxyphenyl)-cyclohexane and 1,1-bis-(4-hydroxyphenyl)-3,3,5-trimethylcyclohexane (bisphenol TMC) as well as their mixtures.

Particularly preferred diphenols are 4,4'-dihydroxydiphenyl, 1,1-bis-(4-hydroxyphenyl)-phenylethane, 2,2-bis-(4-hydroxyphenyl)-propane, 2,2-Bix(3,5-dimethyl-4-hydroxyphenyl)-propane, 1,1-bis-(4-hydroxyphenyl)-cyclohexane and 1,1-bis-(4-hydroxyphenyl)-3,3,5-trimethylcyclohexane (bisphenol TMC) as well as their mixtures.

These and further suitable diphenols are described for example in U.S. Pat. Nos. 2,999,835, 3,148,172, 2,991,273, 3,271,367, 4,982,014 and 2,999,846, German laid-open specifications 1 570 703, 2 063 050, 2 036 052, 2 211 956 and 3 832 396, French patent specification 1 561 518, in the monograph "H. Schnell, Chemistry and Physics of Polycarbonates, Interscience Publishers, New York 1964, p. 28ff; p. 102ff", and in "D. G. Legrand, J. T. Bendler, Handbook of Polycarbonate Science and Technology, Marcel Dekker New York 2000, p. 72 ff.".

In the case of the homopolycarbonates only one diphenol is used, while in the case of the copolycarbonates a plurality of diphenols are used, in which the used bisphenols, like all other chemicals and auxiliary substances added to the synthesis, may be contaminated with impurities originating from their actual synthesis, handling and storage, although it is of course desirable to use raw materials that are as pure as possible.

The monofunctional chain terminators required to regulate the molecular weight, such as phenol or alkylphenols, in particular phenol, p-tert.butylphenol, iso-octylphenol, cumylphenol, their chlorocarbonic acid esters or acid chlorides of monocarboxylic acids or mixtures of these chain terminators, are added either together with the bisphenolate or the bisphenolates to the reaction, or at any suitable time during the synthesis, so long as phosgene or chlorocarbonic acid terminal groups are still present in the reaction mixture, or, in the case of acid chlorides and chlorocarbonic acid esters used as chain terminators, so long as sufficient phenolic terminal groups of the polymer being formed are available. Preferably the chain terminator or terminators are however added after the phosgenation at a site or at a point in time when phosgene is no longer present, but the catalyst has not yet been metered in, or they are added before the catalyst, together with the catalyst, or in parallel thereto.

The catalysts used in the interfacial polymerization process are tertiary amines, in particular triethylamine, tributylamine, trioctylamine, N-ethylpiperidine, N-methylpiperidine, N-i/n-propylpiperidine; quaternary ammonium salts such as tetrabutyl ammonium-/tributylbenzyl ammonium-/tetraethyl ammonium-hydroxide/-chloride/-bromide/-hydrogen sulfate/-tetrafluoroborate; as well as the phosphonium compounds corresponding to the ammonium compounds. These compounds are described in the literature as typical interfacial polymerization catalysts, are commercially available, and are well-known to the person skilled in the art. The catalysts may be added individually, as a mixture, or also one by one and in succession to the synthesis, optionally also before the phosgenation but preferably after the addition of phosgene, unless an onium compound or mixtures of onium compounds is/are used as catalysts, in which case the catalysts are preferably added before the phosgene is metered in. The addition of the catalyst or catalysts may take place in bulk, in an inert solvent, preferably the solvent of the polycarbonate synthesis, or also as aqueous solution, and in the case of tertiary amines, as their ammonium salts with acids, preferably mineral acids, in particular hydrochloric acid. If several catalysts are used or partial amounts of the total amount of catalyst are metered in, then of course different metering procedures may be adopted at different sites or at different times. The total amount of the catalysts used is between 0.001 and 10 mol % referred to moles of bisphenols employed, preferably 0.01 to 8 mol %, particularly preferably 0.05 to 5 mol %.

Homopolycarbonates as well as copolycarbonates are suitable. For the production of copolycarbonates according to the invention there may also be used 1 to 25 wt. %, preferably 2.5 to 25 wt. % (referred to the total amount of diphenols to be employed) of polydiorganosiloxanes with hydroxyl-aryloxy terminal groups. These are known (see for example U.S. Pat. No. 3,419,634) or may be produced by processes known in the literature. The production of polydiorganosiloxane-containing copolycarbonates is described for example in DE-OS 33 34 782.

Preferred polycarbonates are, in addition to bisphenol A homopolycarbonates, also the copolycarbonates of bisphenol A with up to 15 mol %, referred to the mole sum of diphenols, of diphenols other than the preferred or particularly preferred diphenols, in particular 2,2-Bis(3,5-dibromo-4-hydroxyphenyl)-propane and 1,3-dihydroxybenzene.

Furthermore polyester carbonates and block copolyester carbonates are suitable, in particular those described in WO 2000/26275. Aromatic dicarboxylic acid dihalides for the production of aromatic polyester carbonates are preferably the diacid chlorides of isophthalic acids, terephthalic acid, diphenyl ether-4,4'-dicarboxylic acid and naphthalene-2,6-dicarboxylic acid.

Particularly preferred are mixtures of the diacid dichlorides of isophthalic acid and terephthalic acid in a ratio of 1:20 and 20:1.

In the production of polyester carbonates additionally an acarbonic acid halide, preferably phosgene, is co-used as bifunctional acid derivatives.

Suitable chain terminators for the production of the aromatic polyester carbonates include, apart from the already mentioned monophenols, also their chlorocarbonic acid esters as well as the acid chlorides of aromatic carboxylic acids, which may optionally be substituted by C1-C22 alkyl groups or by halogen atoms, as well as aliphatic C2-C22 monocarboxylic acid chlorides.

The amount of chain terminators is in each case 0.1 to 10 mol %, referred in the case of phenolic chain terminators to moles of diphenols, and in the case of monocarboxylic acid chloride chain terminators to moles of dicarboxylic acid dichlorides.

The aromatic polyester carbonates may also contain incorporated aromatic hydroxycarboxylic acids, or in other words incorporated structural units derived from aromatic hydroxycarboxylic acids.

In the thermoplastic aromatic polyester carbonates the proportion of carbonate structural units may vary arbitrarily.

Preferably the proportion of carbonate groups is up to 100 mol %, in particular up to 80 mol %, particularly preferably up to 50 mol %, referred to the sum total of ester groups and carbonate groups.

The ester fraction as well as the carbonate fraction of the aromatic polyester carbonates may be present in the form of blocks or randomly distributed in the polycondensate.

The relative solution viscosity (eta rel) of the aromatic polyester carbonates is in the range 1.18 to 1.4, preferably 1.22 to 1.3 (measured in solutions of 0.5 g of polyester carbonate in 100 ml of methylene chloride solution at 25° C.).

The thermoplastic aromatic polycarbonates and polyester carbonates may be employed individually or in arbitrary mixtures with one another.

Copolycarbonates in the context of the invention are in particular polydiorganosiloxane-polycarbonate block copolymers with a weight average molecular weight (Mw) of ca. 10,000 to 200,000, preferably 20,000 to 80,000 (determined by gel chromatography after prior calibration) and with a content of aromatic carbonate structural units of about 75 to 97.5 wt. %, preferably 85 to 97 wt. %, and a content of polydiorganosiloxane structural units of about 25 to 2.5 wt. %, preferably 15 to 3 wt. %, the block copolymers being produced from polydiorganosiloxanes containing alpha-, omega-bishydroxyaryloxy terminal groups with a degree of polymerization Pn of 5 to 100, preferably 20 to 80.

The polydiorganosiloxane-polycarbonate block copolymers may also be a mixture of polydiorganosiloxane-polycarbonate block copolymers with conventional polysiloxane-free, thermoplastic polycarbonates, the total content of polydiorganosiloxane structural units in this mixture being ca. 2.5 to 25 wt. %.

Such polydiorganosiloxane-polycarbonate block copolymers are characterized in that they contain in the polymer chain on the one hand aromatic carbonate structural units (1) and on the other hand polydiorganosiloxanes containing aryloxy terminal groups (2).

Such polydiorganosiloxane-polycarbonate block copolymers are known for example from U.S. Pat. No. 3,189,662, U.S. Pat. No. 3,821,325 and U.S. Pat. No. 3,832,419.

Preferred polydiorganosiloxane-polycarbonate block copolymers are produced by reacting polydiorganosiloxanes containing alpha-, omega bishydroxyaryloxy terminal groups with other diphenols in the conventional amounts, for example according to the double interfacial polymerization process (see in this regard H. Schnell, Chemistry and Physics of Polycarbonates Polymer Rev. Vol. IX, p. 27 ff, Interscience Publishers New York 1964), the ratio of the bifunctional phenolic reactants being chosen in each case so that the content according to the invention of aromatic carbonate structural units and diorganosiloxy units results therefrom.

Such polydiorganosiloxanes containing alpha-, omega-bishydroxyaryloxy terminal groups are known for example from U.S. Pat. No. 3,419,634.

Various additives may be added to the described substrate materials.

The addition of additives serves to prolong the service life or the color (stabilizers), to simplify the processing (e.g. mold release agents, flow auxiliaries, antistatics) or to match the polymer properties to specific stresses (impact strength modifiers, such as rubbers; flame retardants, colorants, glass fibers).

These additives may be added individually or in arbitrary mixtures or a plurality of different mixtures to the polymer melt and, more specifically, directly during the isolation of the polymer or also after the melting of granular material in a so-called compounding step. In this connection the additives or their mixtures may be added as a solid, i.e. as powder, or as a melt to the polymer melt. Another type of metering is the use of master batches or mixtures of master batches of the additives or additive mixtures.

Suitable additives are described for example in "Additives for Plastics Handbook, John Murphy, Elsevier, Oxford 1999", and in "Plastics Additives Handbook, Hans Zweifel, Hamer, Munich 2001".

Suitable antioxidants and thermal stabilizers are for example:

Alkylated monophenols, alkylthiomethylphenols, hydroquinones and alkylated hydroquinones, tocopherols, hydroxylated thiodiphenyl ethers, alkylidene bisphenols, O-, N- and S-benzyl compounds, hydroxybenzylated malonates, aromatic hydroxybenzyl compounds, triazine compounds, acylaminophenols, esters of β-(3,5-Di-tert-butyl-4-hydroxyphenyl)propionic acid, esters of β-(5-tert-butyl-4-hydroxy-3-methylphenyl)propionic acid, esters of β-(3,5-dicyclohexyl-4-hydroxyphenyl)propionic acid, esters of 3,5-Di-tert-butyl-4-hydroxyphenylacetic acid, amides of β-(3,5-Di-tert-butyl-4-hydroxyphenyl) propionic acid, thiosynergists, secondary antioxidants, phosphites and phosphonites, benzofuranones and indolinones.

Organic phosphites, phosphonates and phosphanes are preferred, generally those in which the organic radicals consist completely or partly of optionally substituted aromatic radicals.

Phosphoric acids mentioned above, and wholly or partially esterified phosphates or phosphites are suitable as complexing agents for heavy metals and for neutralising traces of alkali.

Suitable light-stability agents (UV absorbers) are 2-(2'-hydroxyphenyl)benzotriazoles, 2-hydroxybenzophenones, esters of substituted and unsubstituted benzoic acids, acrylates, sterically hindered amines, oxamides, and 2.8. 2-(2-hydroxyphenyl)-1,3,5-triazines, substituted benzotriazoles being preferred.

Polypropylene glycols alone or in combination with for example sulfones or sulfonamides may be used as stabilizers against damage caused by gamma rays. These and other stabilizers may be used individually or in combination and added in the aforementioned forms to the polymer.

In addition processing auxiliary substances such as mold release agents, generally derivatives of long-chain fatty acids, may be added. Pentaerythritol tetrastearate and glycerol monostearate for example are preferred. They are used individually or as a mixture, preferably in an amount of 0.02 to 1 wt. %, referred to the mass of the composition.

Suitable flame-inhibiting additives are phosphate esters, i.e. triphenyl phosphate, resorcinol diphosphoric acid esters, bromine-containing compounds such as brominated phosphoric acid esters, brominated oligocarbonates and polycarbonates, as well as preferably salts of fluorinated organic sulfonic acids.

Suitable impact modifiers are butadiene rubber with grafted-on styrene-acrylonitrile or methyl methacrylate, ethylene-propylene rubbers with grafted-on maleic anhydride, ethyl acrylate and butyl acrylate rubbers with grafted-on methyl methacrylate or styrene acrylonitrile, interpenetrating siloxane and acrylate networks with grafted-on methyl methacrylate or styrene-acrylonitrile.

Furthermore colorants, such as organic dyes or pigments or inorganic pigments, or IR absorbers, may be added individually, as a mixture or also in combination with stabilizers, glass fibers, (hollow) glass spheres and inorganic fillers.

To produce the films, sheets and cable sheathings the components are mixed and compounded normally at temperatures of ca. 260° C. to 320° C. by means of an extruder.

The films may be smooth on one or both sides, matted on one or both sides, or structured.

The polycarbonate films according to the invention may have a thickness from 50 µm to 1,000 µm. Depending on the area of application, they may also be thicker. The polycarbonate films may also involve multi-layer films, comprising at least two solid moldings, for example films which have been produced by extrusion. In this case the films according to the invention are formed from at least two polymer layers.

To produce films by extrusion the polycarbonate granular material is fed to the filling funnel of an extruder and passes through the latter into the plasticization system, consisting of a screw and cylinder.

The conveyance and melting of the material takes place in the plasticization system. The plastics melt is forced through a slot die. A filtering device, a melt pump, stationary mixing elements and further structural parts may be arranged between the plasticization system and the slot die. The melt leaving the nozzle passes to a smoothing calender. The final forming takes place in the roller gap of the smoothing calender. The shape is fixed finally by cooling and specifically alternately on the smoothing rollers and in the ambient atmosphere. The further devices and equipment serve for the transportation, the application of protective film and the coiling of the extruded films.

In the case of a co-extrusion the material to be co-extruded is plasticized in the same way in one or more further extruders. The co-extrusion melt(s) is/are combined in a special co-extrusion adapter upstream of the nozzle or in a special co-extrusion nozzle together with the main material. The co-extruded layer may be applied to one as well as to both sides of the base layer. A subsequent processing of the films may be carried out by thermoforming or heat deformation or surface treatments such as the application of scratch-resistant coatings, water-repellent layers and other functional layers.

The invention will be explained in more detail hereinafter by means of the following examples, though it is not restricted to these.

EXAMPLES

General Description

The analysis of the particle content of fluorescing particles is carried out by filtering the relevant polycarbonate sample, dissolved in dichloromethane, through a Teflon filter of 5 µm pore size. The filter discs are dried in a vacuum and protected by means of a cover against ambient dust. After filtration the filter surface is scanned by an Axioplan 2 fluorescence microscope from Zeiss AG, Germany. The scanning is carried out at an excitation wavelength of 400-440 nm, an illumination time of 40 millisec per scan, as well as a 25× overall magnification. The fluorescing particles are detected and the data are evaluated using an image processing software (KS 300 3.0 from Zeiss AG). Only particles with a characteristic color (see below) are counted, in other words other particles, such as for example dust, are disregarded. The color parameters for recording the fluorescing particles are adjusted so that they are the same as the parameters of surface defects of particles found on films. The color properties of the particles (characteristic color) are determined with an Axiocam HRc digital color camera from Zeiss AG incorporated in an Axioplan 2 microscope from Zeiss AG according to the HSI (Hue, Saturation, Intensity) color model. The color model is described for example in "Digitale Bildverarbeitung mit dem PC" (digital image processing with PC's) by Hans-Jürgen Schlicht, Addison-Wesley, 1993. If the color of the fluorescing particles is measured, then a hue value of on average ca. 80° (from a minimum 35° to a maximum 100°), a color saturation of on average 150 digits (minimum 0 to maximum 190) and a color intensity of an average 190 digits (from a minimum 130 to a maximum 255) are found. The color properties of other particles, such as for example dust, exhibit hue values of ca. 113° (from a minimum 101° to a maximum 160°), various color saturation values from a minimum of 0 digits to a maximum of 255 digits, and a color intensity of on average 70 digits (from a minimum of 20 to a maximum of 120). The scanning of the surface of the filter is carried out automatically via a computer-controlled microscope stage (Zeiss AG).

The surface defects in the extrusion film are evaluated as follows: a sample of size 0.8 m×0.6 m is taken at the start of each strip of the film to be investigated. This sample is placed on a light desk. The light intensity is >1,000 Lux. Care should be taken to ensure that the sample surface is not affected by dust, fingerprints or other contaminants. In addition the surface must be free from scratches. The light desk is inclined at an angle of 45°. The distance of the light source to the material sample is ca. 100 cm. The observation distance is 50-70 cm. Observation is carried out with the naked eye. The observation time is 300 seconds. All evident defects are noted and recorded. The number of defects of size >0.3 mm is determined, and converted to the number of defects per m$^2$.

Example 1

Example According to the Invention

In the following experiment polycarbonate is produced by a continuous interfacial polymerization process. For this purpose a pumping circulation reactor and two residence time reactors as well as three evaporation stages are used. The bisphenolate solution (bisphenol A), chlorobenzene and methylene chloride as well as phosgene are metered into the pumping circulation reactor, where they are reacted, sodium hydroxide solution likewise also being metered into the pumping circulation reactor. An additional amount of sodium hydroxide solution is metered in upstream of the first residence reactor and the chain terminator solution (solution of phenol in methylene chloride) is metered in. The catalyst is added upstream of the second residence reactor. N-ethylpiperidine is used as catalyst.

After the residence reactors the polycarbonate is present in the form of a 16% solution in a mixture of chlorobenzene and dichloromethane (1:1 by weight). This solution is concentrated by evaporation in three evaporation stages. This is necessary in order to remove dichloromethane and reach a concentration such that the solution may be appropriately degassed in the downstream evaporation extruder. The evaporation stages are operated according to the so-called "flash" method.

In the removal of the solvent by the flash method highly concentrated polymer melts are obtained. In the known flash process polymer solutions are repeatedly heated under a slight excess pressure to temperatures above the boiling point under normal pressure and these solutions, super-heated with respect to normal pressure, are then flashed into a vessel at lower pressure, e.g. normal pressure.

In this case the polycarbonate solution is heated at 0.4 bar excess pressure in the first evaporation stage to 74° C. and then flashed to normal pressure. In the second evaporation stage the solution is heated to 129° C. at 0.8 bar excess pressure and then flashed to normal pressure. In the third evaporation stage the solution is heated to 178° C. at 1.9 bar excess pressure and then flashed to normal pressure.

The solution is then fed into an evaporation extruder and evaporated at 350° C. and at 0.1 bar, and the resin is granulated.

50 g of this granular material are dissolved in 700 ml of dichloromethane (LiChrosolv®; Merck: 1.06044 K33506244 430) and filtered through a Teflon filter membrane (Bola filter membrane, 5 μm pore diameter; depth: 1 mm from Bohlender GmbH, D-97947 Grünsfeld). The evaluation of the particles retained on the filter is carried out as described above via an automated detection using a fluorescence microscope under 25× overall magnification and an illumination time of 40 millisec per scan.

The fluorescence investigation shows 1.02 counts/g. The fluorescence investigation for particles >120 μm shows 0.02 count/g.

The polycarbonate described above is extruded to form a film having a width of 1340 mm. This polycarbonate has a melt volume rate (MVR) of 6 cm$^3$/10 minutes (300° C./1.2 kg), measured according to ISO 1133.

The equipment used included
- an extruder with a screw of 105 mm diameter (D) and a length of 41×D. The screw includes a degassing zone;
- a deflection head;
- a slot die of 1500 mm width;
- a three-roller smoothing calender with a horizontal roller arrangement, the third roller being swivellable by ±45° with respect to the horizontal;
- a roller table;
- a device for applying protective film on both sides;
- a draw-off device;
- a coiling station.

The melt passes from the nozzle to the smoothing calender, the rollers of which have the temperature specified in Table 1. The final shaping and cooling of the material takes place on the smoothing calender. The film is then removed and transported by a draw-off device, a protective film is applied on both sides, following which the film is wound into a coil.

TABLE 1

| Process parameters | |
| --- | --- |
| Temperature extruder Z1-Z9 | 255° C.-270° C. |
| Temperature deflection head | 290° C. |
| Temperature nozzle Z1-Z14 | 290° C.-300° C. |
| Rotational speed of extruder | 67 min$^{-1}$ |
| Temperature roller 1 | 85° C. |
| Temperature roller 2 | 99° C. |
| Temperature roller 3 | 141° C. |
| Calender speed | 4.16 m/min |
| Throughput | 335.6 kg/hour |
| Film width | 1430 mm |

The evaluation and assessment of the film by the method described above shows 104 surface defects per m$^2$.

Example 2

Comparison Example

The polycarbonate is produced as described in Example 1. However, the pressure and the temperature in the first evaporation stage are 63° C. at 0.4 bar excess pressure, in the second evaporation stage are 119° C. at 0.8 bar excess pressure and in the third evaporation stage are 176° C. at 1.9 bar excess pressure. This polycarbonate solution is evaporated as described in Example 1 at 350° C. in an evaporation extruder and then granulated.

50 g of this granular material are dissolved in 700 ml of dichloromethane (LiChrosolv®, Merck: 1.06044 K33506244 430) and filtered through a Teflon filter membrane (Bola, 5 µm pore diameter; depth: 1 mm). The evaluation of the particles retained on the filter is carried out as described above via an automated detection using a fluorescence microscope. The result of the investigation gave 2.22 counts/g.

The production of the film of Example 2 is carried out essentially as described in Example 1. The exact adjustments are given in Table 2. The polycarbonate has a melt volume rate (MVR) of 6 cm$^3$/10 mins (300° C./1.2 kg) measured according to ISO 1133.

The equipment used consists of
- an extruder with a screw of 105 mm diameter (D) and a length of 41×D. The screw includes a degassing zone;
- a deflection head;
- a slot die of 1500 mm width;
- a three-roller smoothing calender with a horizontal roller arrangement, the third roller being swivellable by ±45° with respect to the horizontal;
- a roller table;
- a device for applying protective film on both sides;
- a draw-off device;
- a coiling station.

The melt passes from the nozzle to the smoothing calender, the rollers of which have the temperature specified in Table 2. The final shaping and cooling of the material takes place on the smoothing calender. The film is then removed and transported by a draw-off device, a protective film is applied on both sides, following which the film is wound into a coil.

TABLE 2

| Process parameters | |
|---|---|
| Temperature extruder Z1-Z9 | 255° C.-270° C. |
| Temperature deflection head | 290° C. |
| Temperature nozzle Z1-Z14 | 290° C.-300° C. |
| Rotational speed of extruder | 67 min$^{-1}$ |
| Temperature roller 1 | 85° C. |
| Temperature roller 2 | 99° C. |
| Temperature roller 3 | 141° C. |
| Calender speed | 4.2 m/min |
| Throughput | 333.1 kg/hour |
| Film width/thickness | 1430 mm |

The surface defects in the corresponding film are 232 surface defects per m$^2$.

It is found therefore that the substrate material according to the invention leads to an extrusion film with significantly fewer surface defects.

Although the invention has been described in detail in the foregoing for the purpose of illustration, it is to be understood that such detail is solely for that purpose and that variations may be made therein by those skilled in the art without departing from the spirit and scope of the invention except as it may be limited by the claims.

What is claimed is:

1. In the continuous interfacial polymerization process for producing polycarbonate, the improvement comprising isolating the polycarbonate in three flash stages and an evaporation extruder, characterized in that the temperature in the first flash stage is 70 to 80° C. at 0.35-0.45 bar excess pressure and the temperature in the second flash stage is 125 to 135° C. at 0.75-0.85 bar excess pressure, and the temperature in the third flash stage is 175 to 185° C. at 1.85-1.95 bar excess pressure.

2. The process according to claim 1, wherein the temperature difference between any two consecutive flash stages does not exceed 60° C.

3. The process according to claim 1, further comprising a filtration step coupled with an automated evaluation step to isolate the fluorescing particles and classifies them in order of size.

4. The process according to claim 1, wherein the polycarbonate produced is a linear polycarbonate resin comprising transparent fluorescing particles having a particle count of up to 1.8 counts/g of particles that are between 15 and 250 µm in size, said count being determined by exciting the residue remaining after filtering a solution of said polycarbonate in methylene chloride through a Teflon filter of 5 µm pore size at a wavelength of 400 to 440 nm, 25× overall magnification and illumination time of 40 millisec.

5. The process according to claim 4, wherein the particle count of particles having a diameter greater than 120 µm is not more than 0.02 count/g.

6. A process for producing a polycarbonate with a particle count of 0.1 to 1.8 counts/g of fluorescing particles having a diameter of between 15 and 250 µm, comprising
   a) producing a linear polycarbonate;
   b) determining the particle count of fluorescing particles of size between 15 and 250 µm;
   c) repeating a) and b) while manipulating one or more process parameters of residence time, pressure or temperature, until a particle count of 0.1 to 1.8 counts/g of fluorescing particles having a diameter of between 15 and 250 µm is obtained in b).

7. The process according to claim 6, wherein in c), the particle count of particles having a particle diameter of greater than 120 µm does not exceed 0.02 count/g.

8. The process according to claim 6, wherein in b), the determination of the particle count is carried out by dissolving the polycarbonate in methylene chloride and filtering through a Teflon filter of 5 µm pore size at an excitation wavelength of 400 to 440 nm and a 25× overall magnification with an illumination time of 40 millisec.

9. The process according to claim 6, wherein the linear polycarbonate is produced by a process which comprises isolating a polycarbonate in three flash stages and an evaporation extruder, characterized in that the temperature in the first flash stage is 70 to 80° C. at 0.35-0.45 bar excess pressure and the temperature in the second flash stage is 125 to 135° C. at 0.75-0.85 bar excess pressure, and the temperature in the third flash stage is 175 to 185° C. at 1.85-1.95 bar excess pressure.

* * * * *